United States Patent
Cermak

(10) Patent No.: US 6,796,906 B2
(45) Date of Patent: Sep. 28, 2004

(54) COUNTER TRACK BALL JOINT

(75) Inventor: Herbert Cermak, Bessenbach (DE)

(73) Assignee: GKN Löbro GmbH (DE)

( * ) Notice: Subject to any disclaimer, the term of this patent is extended or adjusted under 35 U.S.C. 154(b) by 0 days.

(21) Appl. No.: 10/070,168

(22) PCT Filed: Jun. 23, 2001

(86) PCT No.: PCT/EP01/07150
§ 371 (c)(1),
(2), (4) Date: Jun. 14, 2002

(87) PCT Pub. No.: WO02/02960
PCT Pub. Date: Jan. 10, 2002

(65) Prior Publication Data
US 2002/0193166 A1 Dec. 19, 2002

(30) Foreign Application Priority Data
Jul. 6, 2000 (DE) .......................................... 100 32 854

(51) Int. Cl.[7] ........................... F16D 3/224; B23P 11/00
(52) U.S. Cl. ........................ 464/145; 29/434; 464/906
(58) Field of Search .................................. 464/145, 144, 464/143, 146, 906; 384/496, 497, 906; 29/434

(56) References Cited
U.S. PATENT DOCUMENTS 3,934,429 A * 1/1976 Takahashi et al. .......... 464/146
4,357,810 A    11/1982 Kumpar
5,167,584 A    12/1992 Krude
5,221,233 A     6/1993 Jacob
6,120,382 A *  9/2000 Sone et al. ................. 464/145
6,206,785 B1 * 3/2001 Thomas ...................... 464/145
6,270,419 B1 * 8/2001 Jacob ......................... 464/145

FOREIGN PATENT DOCUMENTS

DE    42 30 639 C1    10/1993
FR    2 781 023 A1     1/2000
WO    WO 93/16296      8/1993

* cited by examiner

*Primary Examiner*—David Bagnell
*Assistant Examiner*—K. Thompson

(57) ABSTRACT

A constant velocity universal ball joint includes an outer joint part, an inner joint part, torque transmitting balls guided in pairs of tracks, and an annular ball cage held between the outer joint part and the inner joint part, wherein the ball cage forms an inner face which is internally widened between two end apertures of the ball cage. The inner joint part has a greatest outer diameter which is greater than each of the inner diameters of the end apertures of the ball cage. Adjoining inner ball tracks of the inner joint part form webs whose axial length is greater than the circumferential extension of the cage windows of the ball cage. The ball cage can be elastically ovalised to the extent that, when the axes of the ball cage and of the inner joint part intersect one another approximately perpendicularly upon contact between a web of the inner joint part and the inner face of the ball cage, the opposed web of the inner joint part is able to pass through an end aperture.

20 Claims, 6 Drawing Sheets

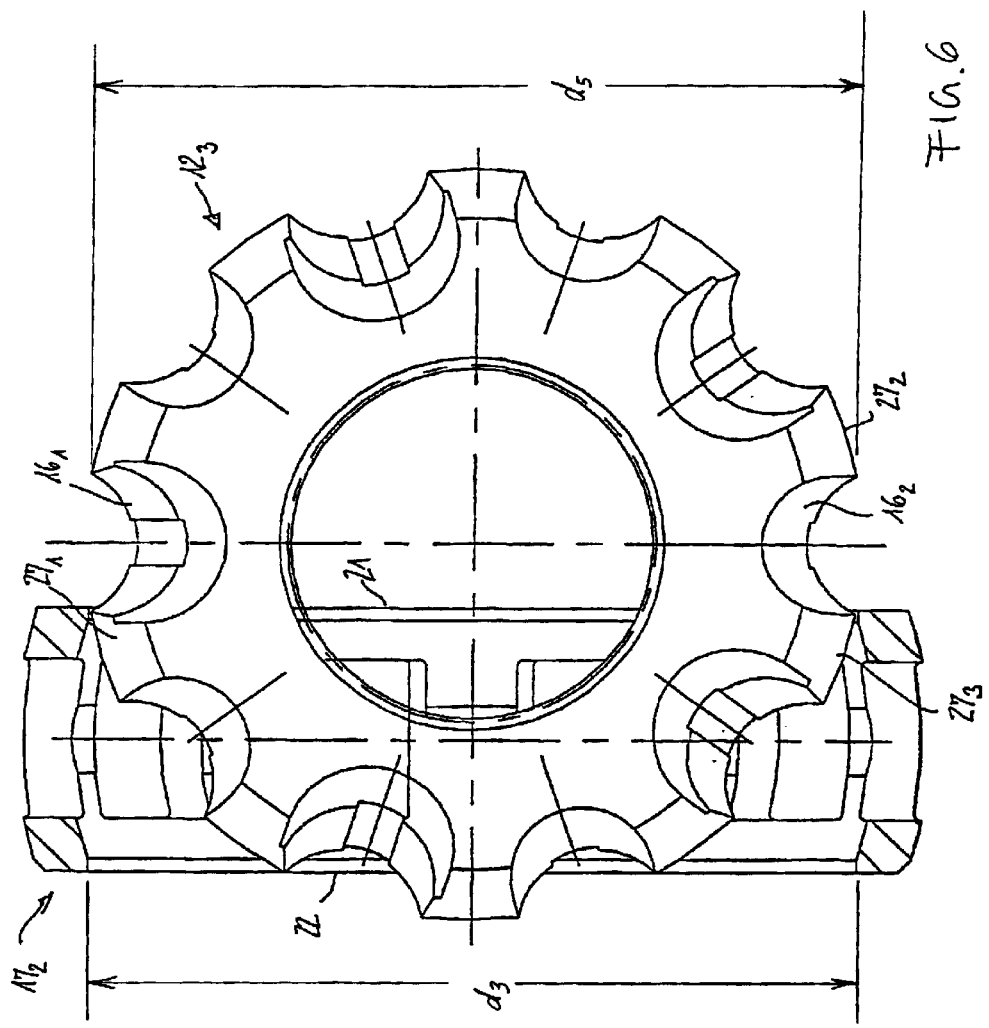

COUNTER TRACK BALL JOINT

DESCRIPTION

Figure 1:
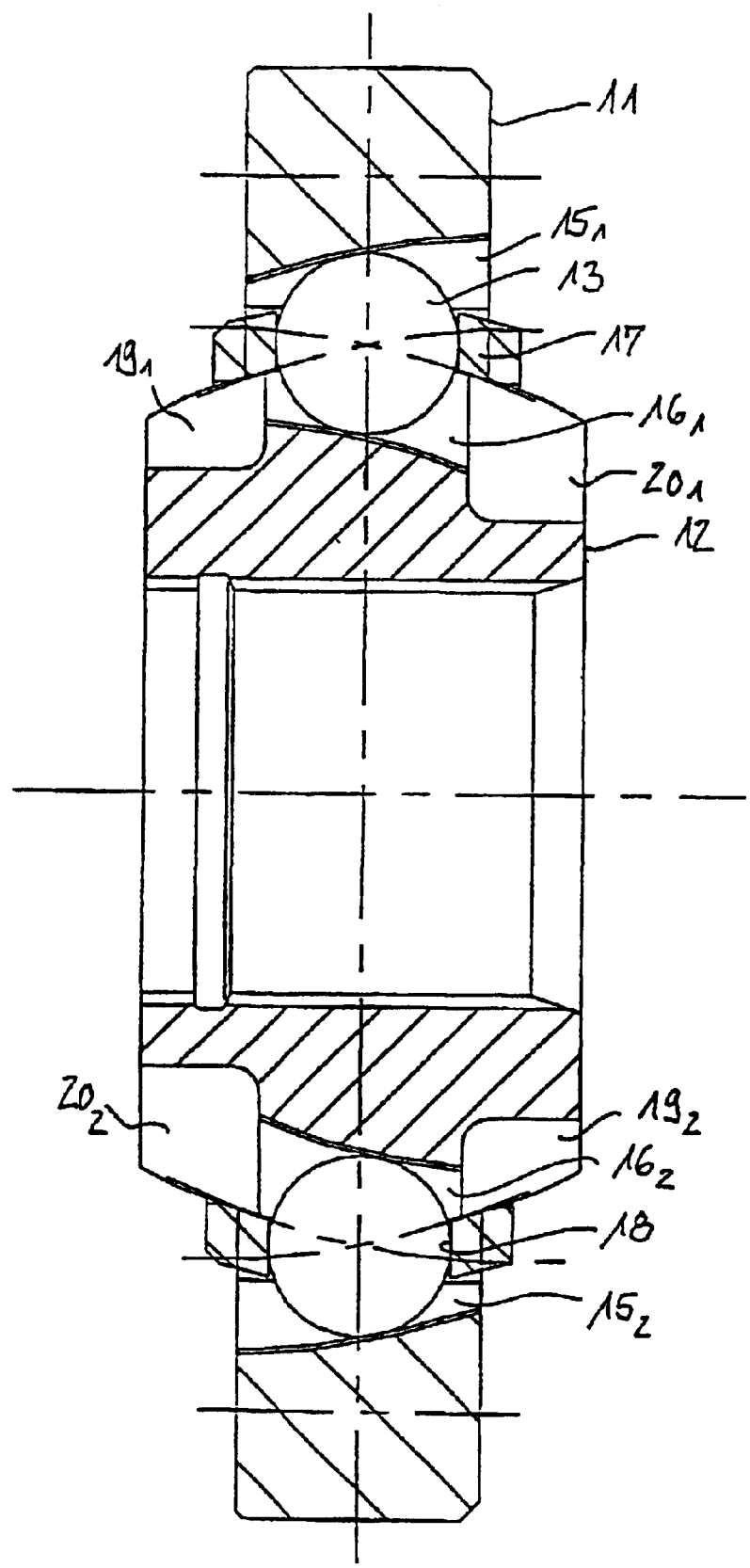

The invention relates to a constant velocity universal ball joint consisting, of an outer joint part with outer ball tracks, an inner joint part with inner ball tracks, torque transmitting balls guided in pairs of tracks formed of one outer ball track and one inner ball track, an annular ball cage held between the outer joint part and the inner joint part and having circumferentially distributed cage windows each receiving one of the balls, the ball cage forms an inner face which is internally widened between two end apertures of the ball cage, the inner joint part comprises a greatest outer diameter which is greater than each of the inner diameters of the end apertures of the ball cage.

With joints of this type, the outer diameter of the inner joint part (ball hub) is greater than the end apertures of the annular ball cage, between which end apertures there extends the widened inner face. The inner face of the bail cage, in this case, is in contact via annular faces with the outer face of the inner joint part, which outer face is formed of individual webs. To be able to insert the inner joint part into the ball cage under these conditions, it is possible to provide the ball cage with notches at the end aperture of the cage through which the inner joint part with the webs is coaxially introduced into the ball cage in a rotational position which is functionally incorrect, whereupon the inner joint part and the ball cage are rotated relative to one another by half the dimension of the window pitch into a functionally accurate position. The length of the webs can be greater than the circumferential extension of the cage windows. As a result of this design, the strength of the ball cage is reduced.

In the case of other joints it is possible for the inner joint part to be inserted into the ball cage through an end aperture of same, with intersecting axes, in such a way that one of the webs of the inner joint part engages one of the cage windows from the inside, and the radially opposite web of the inner joint part can subsequently be introduced through the same end aperture into the cage interior. After the inner joint part has reached its central position in the ball cage, the parts are rotated relative to one another in such a way that their axes coincide. This presupposes that the axial extension of at least one of the webs is shorter than the circumferential extension of the cage windows. Said limitation of the web length restricts the ball guidance in the inner joint part.

With reference to constant velocity fixed ball joints wherein the length of the webs at the inner joint part exceeds the circumferential extension of the cage windows, i.e. in particular with joints with a large number of balls, it is the object of the invention to provide a design which avoids a loss of strength at the cage.

The objective is achieved by combining the following characteristics:
  adjoining inner ball tracks of the inner joint part form webs whose axial length is greater than the circumferential extension of the cage windows of the ball cage, the ball cage can be elastically ovalised to the extent that, when the axes of the ball cage and of the inner joint part intersect one another approximately perpendicularly upon contact between a web of the inner joint part and the inner face of the ball cage, the opposed web of the inner joint part is able to pass through an end aperture.

The means described here allow the provision of joints which, due to relatively small, circular end apertures of identical size at the ball cage, do not suffer from any adverse effects on the cage strength and wherein, in addition, due to the un-reduced length of the webs, ball guidance and the transmission of torque are ensured, even at large articulation angles.

According to a further embodiment it is proposed that the ball cage can be elastically ovalised to the extent that, when the axes of the ball cage and of the inner joint part intersect one another approximately perpendicularly, the inner joint part is able, via the smallest side projection, to pass through an end aperture of the ball cage.

According to yet a further embodiment it is proposed that the ball cage can be elastically ovalised to such an extent that, when the axes of the ball cage and of the inner joint part intersect one another approximately perpendicularly, the inner joint part is able, via the greatest diameter, to pass through the end aperture of the ball cage.

Both the above-mentioned embodiments require a greater deformation of the ball cage, but permit more freedom in respect of assembly sequences, which can be advantageous as far as automation is concerned.

According to a special embodiment it is proposed that a longitudinally extending deepened groove has been worked into the track base of at least one inner ball track of the inner joint part. Furthermore, it is proposed that a centrally circumferentially extending deepened groove has been worked into the inner face of the ball cage. Furthermore, it is conceivable that, at least in a widened end portion of an inner ball track of the inner joint part, there has been worked in a notch which extends centrally relative to the longitudinal extension of the track. With the help of said measures the extent of ovalisation of the ball cage required for mounting the cage can be reduced in that there is achieved a deeper engagement between the inner edge of the end aperture of the cage and the inner ball track of the inner joint part.

The solution in accordance with the invention is particularly suitable for joints with counter tracks wherein pairs of tracks of first outer ball tracks and of first inner ball tracks open in a first axial direction and wherein pairs of tracks of second outer ball track and of second inner ball tracks open in the second opposed axial direction. These joints will primarily be fixed joints wherein inner annular faces of the inner face of the ball cage are in a centring contact with outer faces of the inner joint part.

Preferred embodiments of the invention are illustrated in the Figures and will be described below in greater detail with reference to the drawings wherein FIG. 1 is a longitudinal section through an inventive joint in an assembled condition.

Figure 2A:
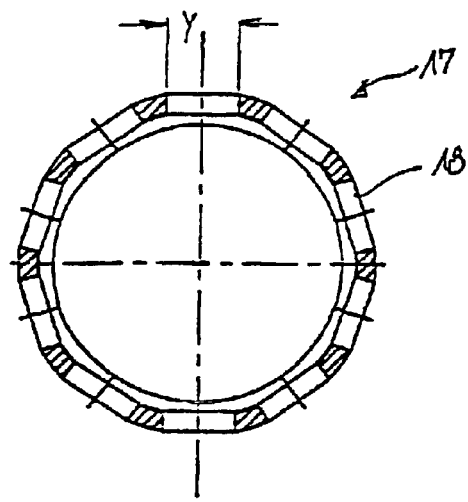
Figure 2B:
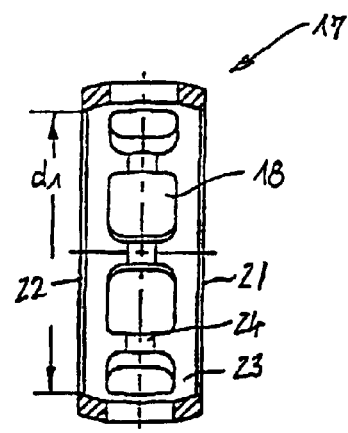
Figure 3A:
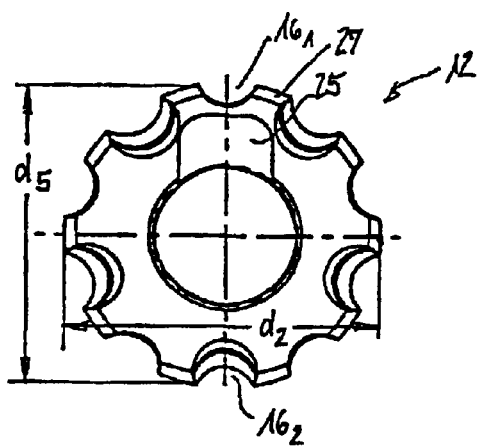
Figure 3B:
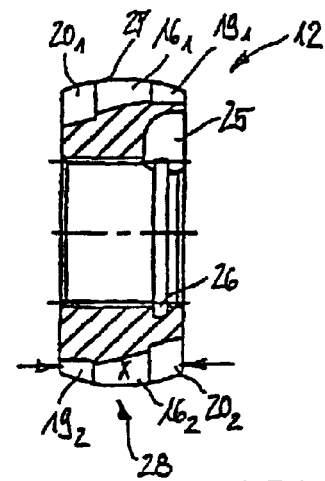

FIG. 2 shows the ball cage on its own
  a) in a cross-section
  b) in a longitudinal section FIG. 3 shows the inner joint part on its own
  a) in an axial view
  b) in a longitudinal section FIG. 4 shows the assembly stages of the ball cage and inner joint part
  a) an axial view of the ovalised ball cage
  b) an axial view of the inner joint part and a longitudinal section of the ball cage, in a first assembly stage
  c) an axial view of the inner joint part and a longitudinal section of the ball cage, in a second assembly stage
  d) an axial view of the inner joint part and a longitudinal section through the ball cage, in a third assembly stage
  e) an axial view of the inner joint part and a longitudinal section through the ball cage, in a fourth assembly stage f) an axial view of the inner joint part and a longitudinal section through the ball cage, in a fifth assembly stage.

FIG. 5 Assembly stages of the ball cage and inner joint part:

a) an axial view of the inner joint part and a longitudinal section through the ball cage, in a first assembly stage b) an axial view of the inner joint part and a longitudinal section of the ball cage, in a second assembly stage c) an axial view of the inner joint part and a longitudinal section through the ball cage, in a third assembly stage.

FIG. 6 For the assembly condition: smallest side projection:

an axial view of the inner joint part and a longitudinal section through the ball cage, in the characteristic assembly condition.

FIG. 7 For the most favourable assembly condition regarding the assembly of the ball cage and inner joint part:

a) an axial view of the ovalised ball cage b) an axial view of the inner joint part and a longitudinal section through the ball cage in the characteristic assembly stage.

FIG. 1 is a longitudinal section through a constant velocity fixed ball joint of the type of a counter track joint; it shows an outer joint part 11, an inner joint part 12, balls 13 and a ball cage 17 in the form of different individual components. In the upper half of the Figure there is shown a pair of tracks consisting of a first outer ball track $15_1$ in the outer joint part and a first inner ball track $16_1$ in the inner joint part which forms an opening angle which opens towards the right. In the lower half of the Figure it is possible to see a pair of tracks consisting of a second outer ball track $15_2$ in the outer joint part and a second inner ball track $16_2$ in the inner joint part which forms an opening angle which opens towards the left. A joint with this kind of ball track formation is called a counter track joint. The two types of pairs of tracks—if viewed across the circumference—normally alternate with one another, i.e. as a rule, such joints are provided with an even number of balls. The balls 13 are received by cage windows 18 in the ball cage 17 which holds all the balls in such a way that their centers are located in a common plane. The inner ball tracks 16 comprise widening end portions 19, 20 which cannot have ball guiding functions. Further details will be explained with reference to the following FIGS. 2 and 3.

FIG. 2 shows the ball cage 17 in the form of a detail which comprises a total number of ten circumferentially distributed cage windows 18. The annular ball cage comprises two end apertures 21, 22 with a diameter $d_1$. Between said end apertures, there extends a widened inner face 23 which comes into a centering contact with outer faces of the inner joint part. In the inner face 23 there is provided a deepened circumferential groove 24 which extends in portions between the cage windows 18.

FIG. 3 shows an inner joint part 2 in the form of a detail comprising first inner ball grooves $16_1$ and second inner ball grooves $16_2$ which extend in opposite directions relative to one another and which widen in opposite axial directions. The respective widening end portions 19, 20 can also be seen. It can be seen that one of the end faces is provided with a recess 25 which is not related to the subject of the invention and whose purpose it is to permit a securing ring to be inserted into an inner groove 26. Each two adjoining inner ball grooves $16_1$, $16_2$, together, form a web 27 whose axial extension x, which substantially corresponds to the axial length of the inner joint part 12, is greater than the circumferential extension y of the cage window 18 in the ball cage according to FIG. 2. Webs positioned opposite one another, together, form a greatest outer diameter $d_2$ of the inner joint part. Inner ball grooves $16_1$, $16_2$ positioned opposite one another, by means of their delimiting edges, define the smallest side projection with an outer diameter $d_5$. The webs form part of an outer surface 28 of which partial regions come into stop contact with the inner face 23 of the ball cage 17, which stop contact delimits the axial path, or into a centering guiding contact therewith.

Figure 4A:
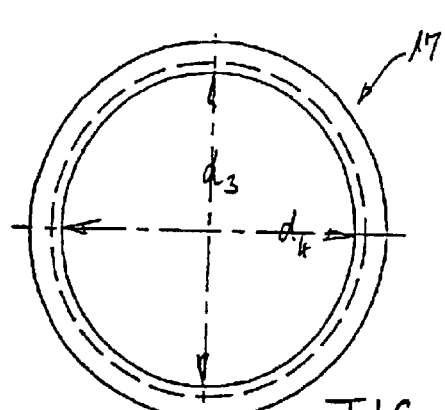

FIG. 4a shows the ball cage 17 in an elastically ovalised condition permitting the assembly of the inner joint part which can be ovalised up to a maximum extent such that there remains a permanent deformation of 2% after the load has been removed. The maximum dimension $d_3$ of the end apertures 21, 22 has been increased relative to the starting diameter $d_1$ and the minimum dimension $d_4$ of the end apertures 21, 22 has been decreased relative to the starting diameter.

Figure 4B:
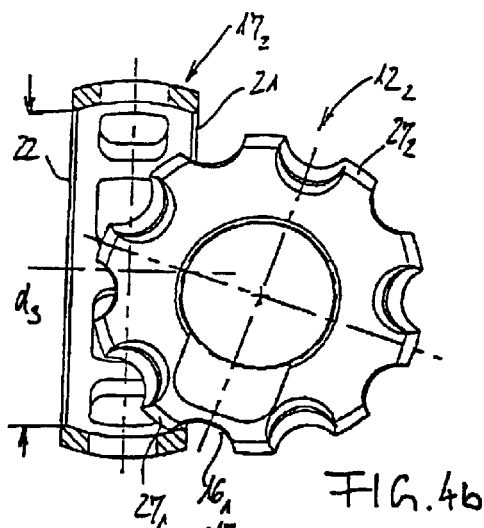
Figure 4C:
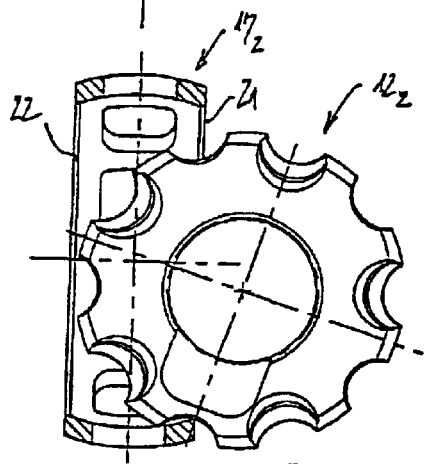
Figure 4D:
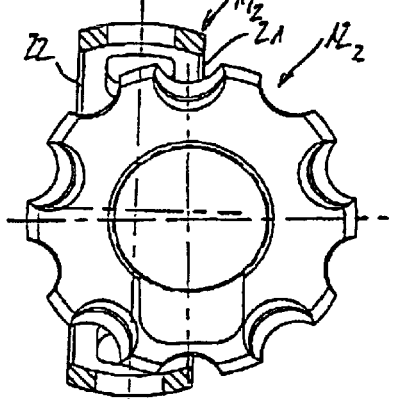

FIG. 4b shows the ball cage 17 (shown in section) in a position which corresponds to the illustration of FIG. 4a, so that the maximum dimension $d_3$ is shown in the sectional plane. The embodiment of the ball cage $17_2$ shown here deviates from the cage 17 in FIG. 2 in that it does not comprise an inner circumferential groove. An inner joint part 12 whose axis is positioned perpendicularly on the drawing plane is shown in a plan view in a position in which it has been partly inserted through the end aperture 21 into the interior of the ball cage $17_2$ whose axis is shown to be positioned in the drawing plane. In the region of the maximum dimension $d_3$, the circumferential edge of the end aperture 21 engages one of the first inner ball tracks $16_1$ of the inner joint part 12. A web 27 adjoining same, by means of its edge, contacts the inner face 23 of the ball cage $17_2$.

Figure 4E:
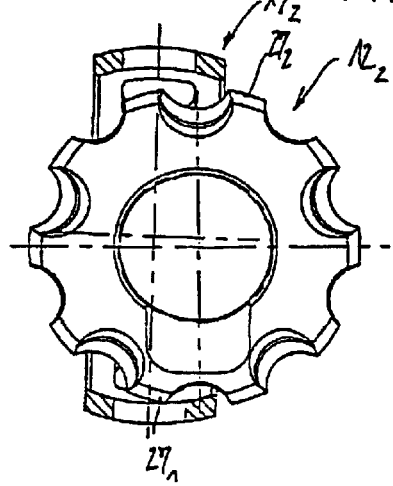
Figure 4F:
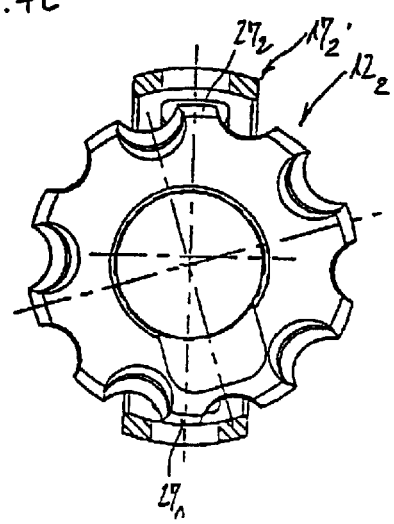

In FIGS. 4c to 4f, the illustration of the ball cage $17_2$ remains unchanged; they show a progressive rolling movement of the inner joint part 12 along said edge of the web $27_1$, with a web $27_2$ positioned radially opposite web $27_1$, at an imaginary point in time between the movement phases according to FIGS. 4e and 4f, passing with a close play through the first end aperture 21 of the ball cage $17_2$. This can be achieved only by increasing the maximum dimension $d_3$ relative to the starting diameter $d_1$ which would not permit such a passage.

FIG. 5 shows a ball cage 17 (b, c) which is modified in some illustrations, and an inner joint part 12 (a, c) which is modified in some illustrations; they are both shown in three stages of being assembled relative to one another, which approximately correspond to the illustrations according to FIGS. 4b (5a) and 4e (5b and 5c).

Figure 5A:
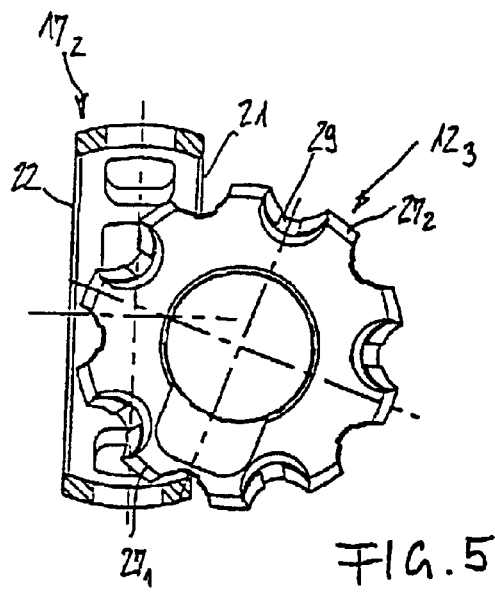

In FIG. 5a, the cage $17_2$ fully corresponds to that shown in FIG. 4. The inner joint part $12_3$, on the other hand, comprises deepened grooves 29 in the inner ball tracks 16 which longitudinally extend along the track base and which, while the inner joint part $12_3$ is being inserted into the ball cage $17_2$, can be engaged by the inner edge of the end aperture 21, so that the extent of ovalisation of the ball cage $17_2$ can be reduced.

Figure 5B:
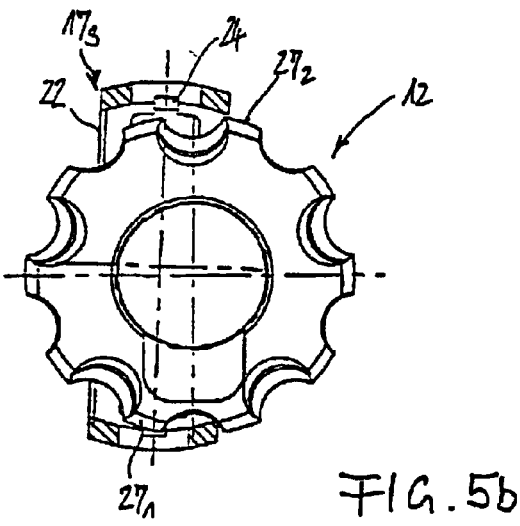

In FIG. 5b, the ball cage $17_3$ with an inner circumferential groove 24 is shown so as to correspond approximately to the illustration of FIG. 2, whereas the inner joint part $12_2$ corresponds to the embodiment and illustration of FIG. 3. In the course of the stage during which the second web $27_2$ passes through the end aperture 21, the edge of the web $27_1$ engages portions of the circumferential groove 24 in the inner face 23, so that the extent of ovalisation of the ball cage $17_3$ can be reduced for this assembly stage.

Figure 5C:
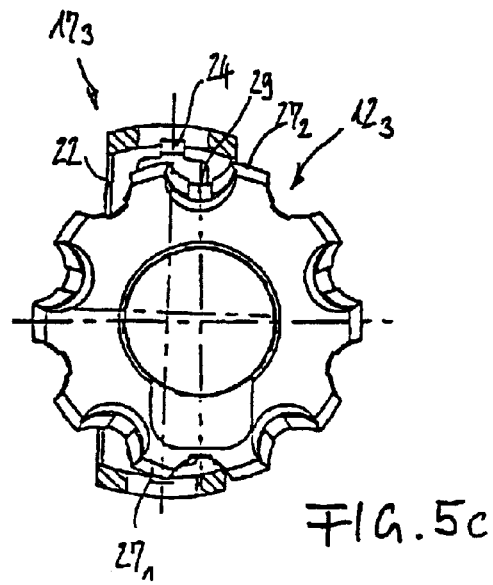

FIG. 5c shows the ball cage $17_3$ in the embodiment as shown in the previous FIG. 5b, whereas the inner joint part $12_3$ is shown in the embodiment according to FIG. 5a. In this case, too, while the second web $27_2$ passes through the end aperture 21, one edge of the first web $27_1$ enters the circumferential groove 24, as in FIG. 5b.

FIG. 6, similarly to FIG. 5, shows a greatly ovalised ball cage $17_3$ and an inner joint part $12_3$ which is ovalised in such a way that the aperture dimension $d_3$ is greater than/equal to the diameter $d_5$ of the smallest side projection of the inner joint part. Two webs $27_1$, $27_3$ which adjoin two opposed tracks $16_1$, $16_2$ are in the process of passing through the aperture 21 of the ball cage $17_3$.

Figure 7B:
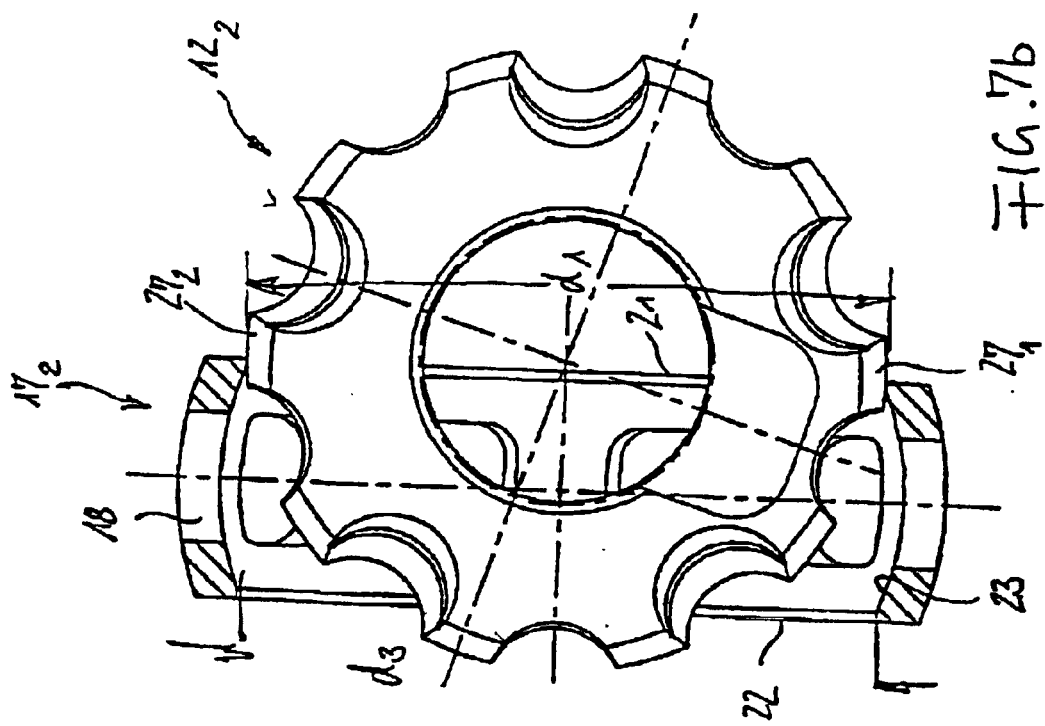
Figure 7A:
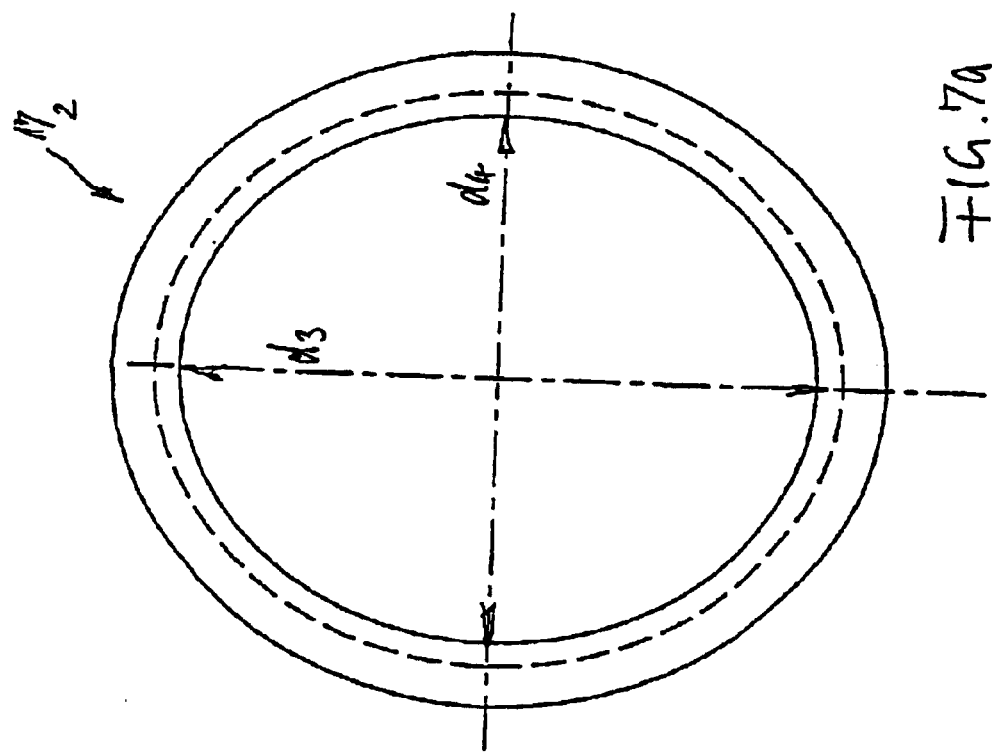

FIG. 7a shows a greatly ovalised ball cage $17_2$ which is similar to that shown in FIG. 4a and whose maximum dimension $d_3$ is greater than the inner diameter $d_1$ and whose minimum dimension $d_4$ of the end aperture 21 is smaller than the undeformed inner diameter $d_1$.

It can be seen in FIG. 7b that the cage is ovalised to such an extent that the diameter $d_1$ of the inner joint part $12_2$ is smaller than/equal to the aperture dimension $d_3$, so that the inner joint part can be slid via the opposed webs $27_1$, $27_2$ through the end aperture 21 into the cage $17_2$.

As soon as, according to FIGS. 6 and 7, the webs $27_1$, $27_2$ are positioned completely inside the ball cage 17, i.e. approximately in the plane of the windows 18, the two parts 12, 17 are pivoted relative to one another by 90° in such a way that their axes coincide. In this position, the outer face 28 of the inner joint part comes into a guiding and axially fixing contact with the inner face 23 of the ball cage. Thereafter, the parts are rotated relative to one another in such a way that the inner ball tracks 16 become radially associated with the cage windows 18. The remaining ball and joint assembly procedures take place in accordance with the state of the art.

Counter Track Joint

| List of reference numbers | |
|---|---|
| 11 | outer joint part |
| 12 | inner joint part |
| 13 | ball |
| 14 | |
| 15 | outer ball track |
| 16 | inner ball track |
| 17 | ball cage |
| 18 | cage window |
| 19 | |
| 20 | |
| 21 | end aperture |
| 22 | end aperture |
| 23 | inner face |
| 24 | circumferential groove |
| 25 | recess |
| 26 | inner groove |
| 27 | web |
| 28 | outer face |

What is claimed is:

1. A method of assembling a constant velocity universal ball joint comprising:
providing an outer joint part (11) with outer ball tracks (15), an inner joint part (12) with inner ball tracks (16), torque transmitting balls (13) guided in pairs of tracks comprising one of said outer ball tracks (15) and one inner ball tracks (16), and an annular ball cage (17) held between the outer joint part (11) and the inner joint part (12) and having circumferentially distributed cage windows (18) each receiving one of the balls (13), the ball cage (17) comprising an inner face (23) which is internally widened between two end apertures (21, 22) of the ball cage, the end apertures (21, 22) defining an inner diameter ($d_1$), the inner joint part (12) defining an outer diameter ($d_2$) which is greater than the inner diameter ($d_1$) of the end apertures (21, 22) of the ball cage, and wherein adjoining inner ball tracks (16) of the inner joint part (12) form webs (27) whose axial length (x) is greater than a circumferential extension (y) of the cage windows (18) of the ball cage (17);

elastically ovalising the ball cage (17); and when respective axes of the ball cage (17) and of the inner joint part (12) intersect one another approximately perpendicularly upon contact between a web ($27_1$) of the inner joint part (12) and the inner face (23) of the ball cage (17), passing an opposed web ($27_2$) of the inner joint part (12) through an end aperture (21, 22).

2. A method according to claim 1, wherein the ball cage (17) is elastically ovalized such that, when respective axes of the ball cage (17) and of the inner joint part (12) intersect one another approximately perpendicularly, the inner joint part (12) is able, by way of a smallest side projection diameter ($d_5$), to pass through an end aperture (21, 22) of the ball cage.

3. A method according to claim 1, wherein the ball cage (17) is elastically ovalised to such that, when respective axes of the ball cage (17) and of the inner joint part (12) intersect one another approximately perpendicularly, the inner joint part (12) is able, by way of the inner diameter ($d_1$), to pass through the end aperture (21, 22) of the ball cage.

4. A method according to claim 1 comprising providing a notch in a widened end portion (19, 20) of an inner ball track (16) of the inner joint part, said notch extending centrally relative to a longitudinal extension of the track.

5. A joint according to claim 1 wherein the joint is a counter track joint wherein pairs of tracks of first outer ball tracks ($15_1$) and of first inner ball tracks ($16_1$) open in a first axial direction, and wherein pairs of tracks of second outer ball tracks ($15_2$) and of second inner ball tracks ($16_2$) open in the second axial direction.

6. A method according to claim 1 wherein the joint is a fixed joint, wherein inner annular faces of the inner face (23) of the ball cage (17) are in centering contact with outer faces (28) of the inner joint part (12).

7. A constant velocity universal ball joint comprising:
an outer joint part (11) with outer ball tracks (15), an inner joint part (12) with inner ball tracks (16), torque transmitting balls (13) guided in pairs of tracks comprising one of said outer ball tracks (15) and one of said inner ball tracks (16), and an annular ball cage (17) held between the outer joint part (11) and the inner joint part (12) and having cirucmferentially distributed cage windows (18) each receiving one of the balls (13), the ball cage (17) comprising an inner face (23) which is internally widened between two end apertures (21, 22) defining an inner diameter ($d_1$), the inner joint part (12) defining an outer diameter ($d_2$) which is greater than the inner diameter ($d_1$) of the end apertures (21, 22) of the ball cage, and wherein adjoining inner ball tracks (16) of the inner joint part (12) form webs (27) whose axial length (x) is greater than a circumferential extension (y) of the cage windows (18) of the ball cage (17), and wherein the ball cage (17) is elastically ovalizable such that, when respective axes of the ball cage (17) and of the inner joint part (12) intersect one another approximately perpendicularly upon contact between a web ($27_1$) of the inner joint part (12) and the inner face (23)

of the ball cage (17), an opposed web (27₂) of the inner joint part (12) is able to pass through an end aperture (21, 22); and wherein the joint comprises a longitudinally extending deepened groove (29) in a track base of at least one inner ball track (16) of the inner joint part (12).

8. A joint according to claim 7, wherein the ball cage (17) is elastically ovalized such that, when respective axes of the ball cage (17) and of the inner joint part (12) intersect one another approximately perpendicularly, the inner joint part (12) is able, by way of a smallest side projection diameter ($d_5$), to pass through an end aperture (21, 22) of the ball cage.

9. A joint according to claim 7, wherein the ball cage (17) is elastically ovalised such that, when respective axes of the ball cage (17) and of the inner joint part (12) intersect one another approximately perpendicularly, the inner joint part (12) is able, by way of a inner diameter ($d_1$), to pass through the end aperture (21, 22) of the ball cage.

10. A joint according to claim 7 comprising a centrally circumferentially extending deepened groove (24) in the inner face (23) of the ball cage (17).

11. A joint according to claim 10 comprising a notch in a widened end portion (19, 20) of an inner ball track (16) of the inner joint part, said notch extending centrally relative to a longitudinal extension of the track.

12. A joint according to claim 10 wherein the joint is a counter track joint wherein pairs of tracks of first outer ball tracks ($15_1$) and of first inner ball tracks ($16_1$) open in a first axial direction, and wherein pairs of tracks of second outer ball tracks ($15_2$) and of second inner ball tracks ($16_2$) open in the second axial direction.

13. A joint according to claim 10 wherein the joint is a fixed joint, wherein inner annular faces of the inner face (23) of the ball cage (17) are in centering contact with outer faces (28) of the inner joint part (12).

14. A joint according to claim 7 comprising a notch in a widened end portion (19, 20) of an inner ball track (16) of the inner joint part, said notch extending centrally relative to a longitudinal extension of the track.

15. A joint according to claim 7 wherein the joint is a counter track joint wherein pairs of tracks of first outer ball tracks ($15_1$) and of first inner ball tracks ($16_1$) open in a first axial direction, and wherein pairs of tracks of second outer ball tracks ($15_2$) and of second inner ball tracks ($16_2$) open in the second axial direction.

16. A constant velocity universal ball joint comprising:

an outer joint part (11) with outer ball tracks (15), an inner joint part (12) with inner ball tracks (16), torque transmitting balls (13) guided in pairs of tracks comprising one of said outer ball tracks (15) and one of said inner ball tracks (16), and an annular ball cage (17) held between the outer joint part (11) and the inner joint part (12) and having circumferentially distributed cage windows (18) each receiving one of the balls (13), the ball cage (17) comprising an inner face (23) which is internally widened between two end apertures (21, 22) of the ball cage, the end apertures (21, 22) defining an inner diameter ($d_1$), the inner joint part (12) defining an outer diameter ($d_2$) which is greater than the inner diameter ($d_1$) of the end apertures (21, 22) of the ball cage, and wherein adjoining inner ball tracks (16) of the inner joint part (12) form webs (27) whose axial length (x) is greater than a circumferential extension (y) of the cage windows (18) of the ball cage (17), and wherein the ball cage (17) is elastically ovalizable such that, when respective axes of the ball cage (17) and of the inner joint part (12) intersect one another approximately perpendicularly upon contact between a web ($27_1$) of the inner joint part (12) and the inner face (23) of the ball cage (17), an opposed web ($27_2$) of the inner joint part (12) is able to pass through an end aperture (21, 22); and wherein the joint comprises a longitudinally extending deepened groove (24) in inner face (23) of the ball cage (17).

17. A joint according to claim 16, wherein the ball cage (17) is elastically ovalised such that, when respective axes of the ball cage (17) and of the inner joint part (12) intersect one another approximately perpendicularly, the inner joint part (12) is able, by way of a smallest side projection diameter ($d_5$), to pass through an end aperture (21, 22) of the ball cage.

18. A joint according to claim 16, wherein the ball cage (17) is elastically ovalised such that, when respective axes of the ball cage (17) and of the inner joint part (12) intersect one another approximately perpendicularly, the inner joint part (12) is able, by way of a inner diameter ($d_1$), to pass through the end aperture (21, 22) of the ball cage.

19. A joint according to claim 16 comprising a notch in a widened end portion (19, 20) of an inner ball track (16) of the inner joint part, said notch extending centrally relative to a longitudinal extension of the track.

20. A joint according to claim 16 wherein the joint is a counter track joint wherein pairs of tracks of first outer ball tracks ($15_1$) and of first inner ball tracks ($16_1$) open in a first axial direction, and wherein pairs of tracks of second outer ball tracks ($15_2$) and of second inner ball tracks ($16_2$) open in the second axial direction.

* * * * *